(12) United States Patent  
Hirakawa et al.

(10) Patent No.: US 7,464,782 B2  
(45) Date of Patent: Dec. 16, 2008

(54) TRACTOR WITH CABIN

(75) Inventors: Kenkichi Hirakawa, Izumi (JP); Tsutomu Toiguchi, Izumi (JP)

(73) Assignee: Kubota Corporation, Osaka (JP)

( * ) Notice: Subject to any disclaimer, the term of this patent is extended or adjusted under 35 U.S.C. 154(b) by 595 days.

(21) Appl. No.: 11/074,576

(22) Filed: Mar. 8, 2005

(65) Prior Publication Data

US 2006/0027408 A1 Feb. 9, 2006

(30) Foreign Application Priority Data

Jul. 28, 2004 (JP) ............................. 2004-220418

(51) Int. Cl.
*B62D 25/08* (2006.01)
*B62D 33/06* (2006.01)

(52) U.S. Cl. ............... 180/89.12; 180/900; 280/834; 296/187.03; 296/187.09; 296/190.07; 296/190.01

(58) Field of Classification Search ............... 180/900, 180/89.1, 89.12, 89.13; 280/831, 834; 296/187.03, 296/187.09, 187.11, 187.12, 190.01, 190.03, 296/190.04, 190.07, 190.08

See application file for complete search history.

(56) References Cited

FOREIGN PATENT DOCUMENTS

| JP | 11-291959 | 10/1999 |
|----|-----------|---------|
| JP | 2003-2239 | 1/2003  |

*Primary Examiner*—Ruth Ilan
(74) *Attorney, Agent, or Firm*—The Webb Law Firm

(57) ABSTRACT

In a preferred embodiment of the present invention, a fuel tank is supported by the front surface of an operator's cabin. A center frame fixed to a body is coupled to the fuel tank via an external-force transmission part. The external-force transmission part permits vertical movement of the cabin relative to the center frame, while regulating lateral movement of the cabin relative to the center frame when an external force greater than a predetermined value is applied to the cabin.

11 Claims, 6 Drawing Sheets

TRACTOR WITH CABIN

BACKGROUND OF THE INVENTION

1. Field of the Invention

The present invention relates to a tractor with cabin, and more particularly to such a tractor with its fuel tank supported by a cabin frame.

2. Related Art

As disclosed in Japanese Patent Application Publication No. 2003-2239, for example, a known tractor with a cabin has an arch-shaped support frame vertically arranged on a body between an engine hood and an operator's cabin, and a fuel tank coupled to and supported by the support frame.

In a structure in which the fuel tank is attached to a support frame fixed to the body, it is necessary, when mounting the operator's cabin to the body via vibration isolators, to create space around the fuel tank that allows for vertical displacement of the cabin, so that the cabin, when vertically displaced, does not interfere or come in contact with the fuel tank. To this end, either the dimensions of the fuel tank needs to be reduced or the occupant space of the cabin sacrificed to create space near the cabin for deploying the fuel tank.

SUMMARY OF THE INVENTION

The present invention focuses on the above points.

To achieve this object, a tractor according to the present invention comprises: a body supported by front wheels and rear wheels; an operator's cabin mounted on a rear portion of the body via a vibration-isolation coupler; a fuel tank supported by a front surface of the cabin; a center frame fixed to the body and enclosing at least both side surfaces and a upper surface of the fuel tank; and an external-force transmission part provided between the cabin and the center frame, and capable of transmitting a lateral external force acting on the cabin to the center frame without transmitting a vertical external force.

The fuel tank thus displaces together with the cabin, making the formation of a gap between the fuel tank and the cabin for absorbing displacement of the cabin unnecessary.

When the cabin receives a large lateral external force, this lateral external force is also transmitted to the center frame via the external-force transmission part, resulting in the center frame being displaced laterally together with the cabin. Any lateral displacement of the cabin is also suppressed due to the stiffness of the center frame.

Thus by supporting the fuel tank against the operator's cabin, the provision of space having no use value for the movement of the fuel tank relative to the cabin becomes unnecessary.

BRIEF DESCRIPTION OF THE DRAWINGS

These and other objects, advantages, and features of the invention will become apparent from the following description thereof taken in conjunction with the accompanying drawings, which illustrate specific embodiments of the present invention.

In the drawings.

DETAILED DESCRIPTION OF PREFERRED EMBODIMENTS

Figure 1:
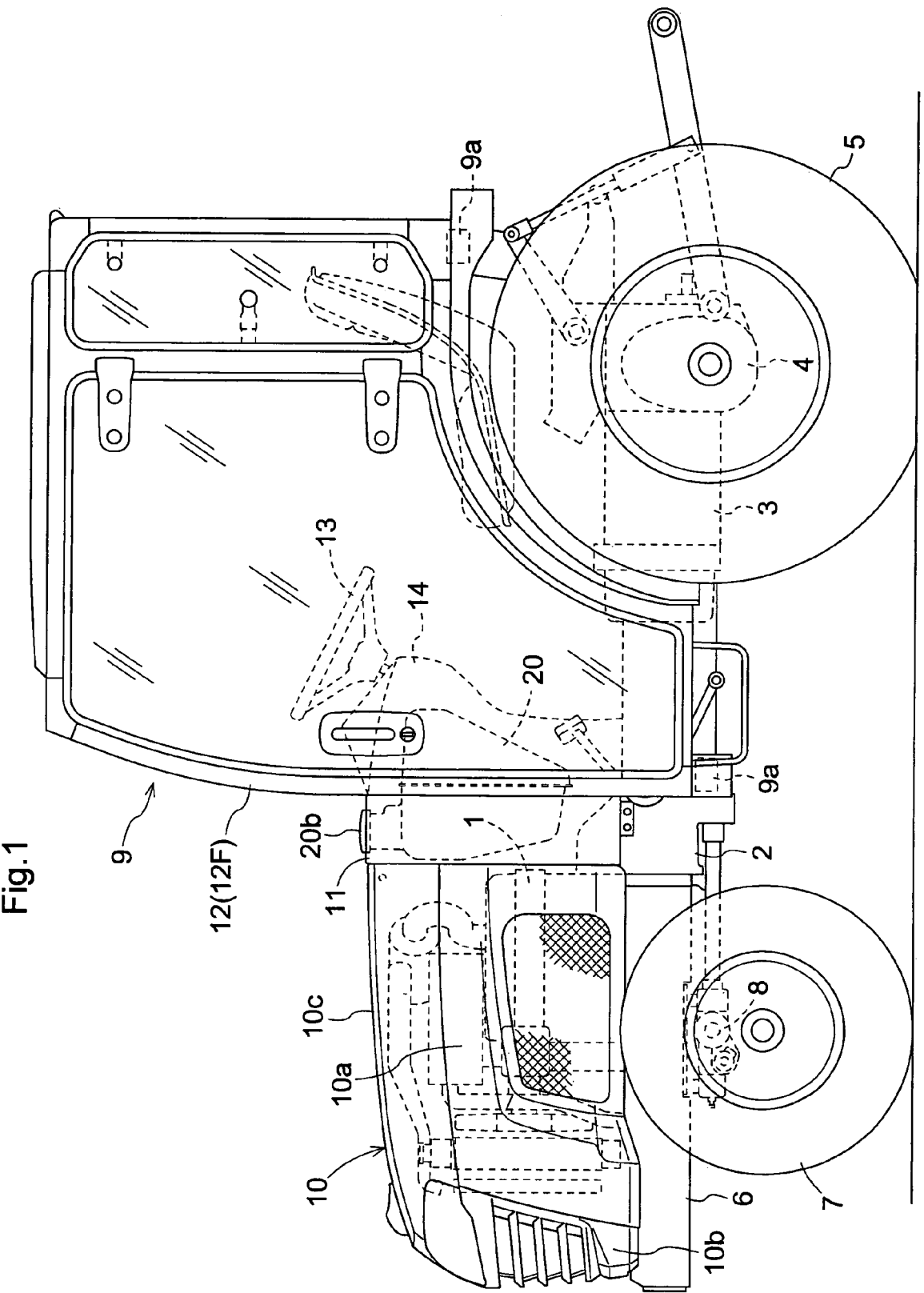
FIG. 1 is an overall side view of a tractor with a cabin.
Figure 2:
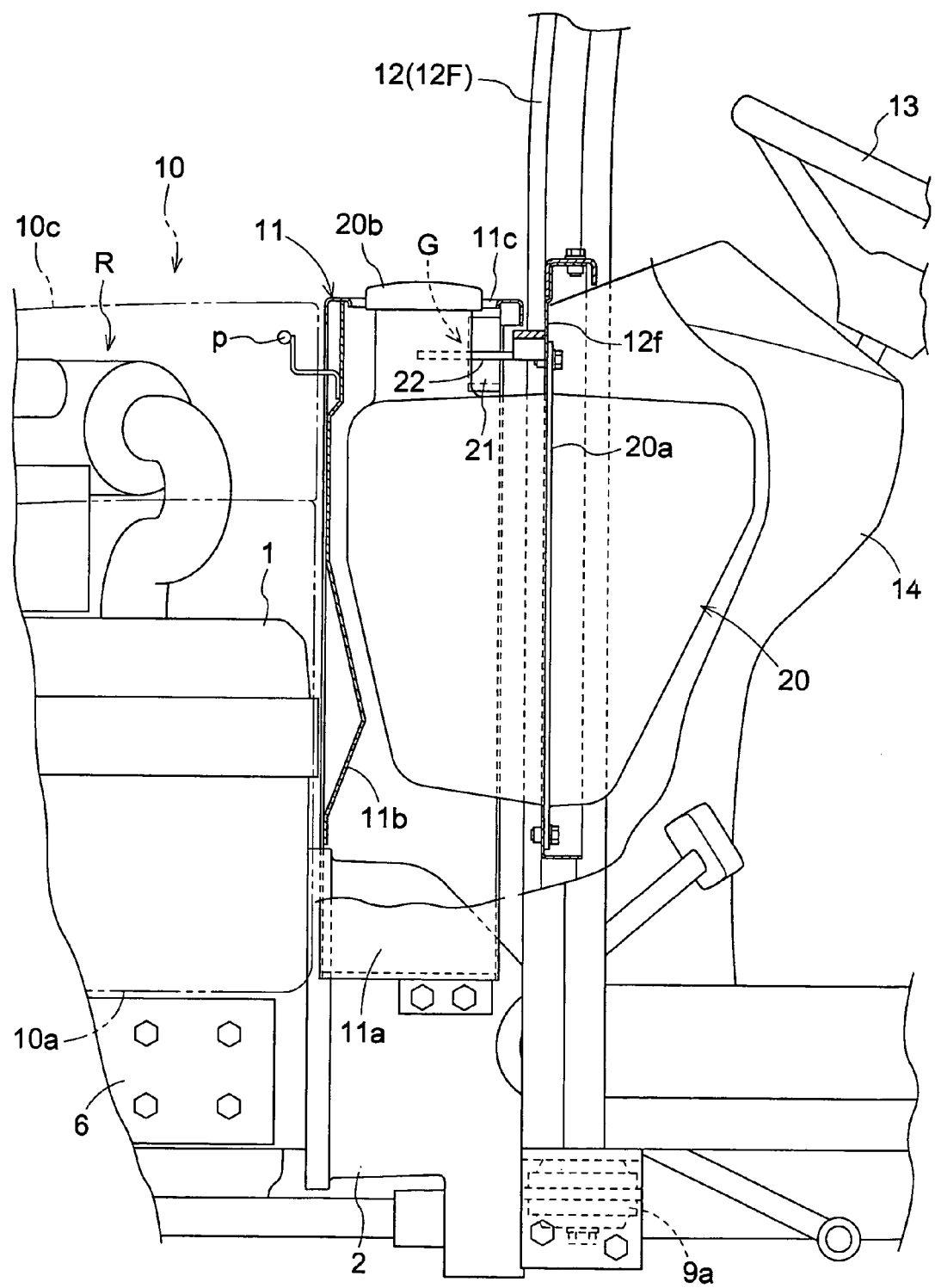
FIG. 2 is a partial cut-away side view of a main portion thereof.

FIG. 1 shows a tractor with a cabin. A body of the tractor with cabin houses an engine 1 disposed in a front portion of the body, a clutch housing 2 behind the engine 1, a transmission case 3, and a differential case 4. Rear wheels 5 are rotationally supported on both sides of differential case 4, and a front axle case 8, steerably mounting left and right front wheels 7, is supported by a front frame 6 mounted to a lower portion of the engine 1 such that the front axle can roll about a longitudinal axis. An operator's cabin 9 is supported on a rear portion of the body via vibration-isolation couplers 9a.

The engine 1 and associated components are housed within an engine room R covered by a the hood 10, with a the center frame 11 vertically arranged on a clutch housing 2 between the hood 10 and the cabin 9.

The center frame 11 is deep front to back and has an upper portion extending generally horizontally, a frame body 11a having a pair of legs that support the upper portion, and a vertical wall 11b blocking a front portion of the frame body. The center frame 11 functions as the rear wall of the engine room R.

The hood 10 has a lower hood 10a that spans between the front frame 6 and the center frame 11, a front grill 10b fixed to a front portion of the lower hood, and an upper hood 10c that spans and is disposed on lower hood 10a and an upper portion of front grill 10b. Upper hood 10c is supported to the center frame 11 such that it can be opened by swinging about a fulcrum p relative to the upper portion of the center frame 11.

Figure 4:
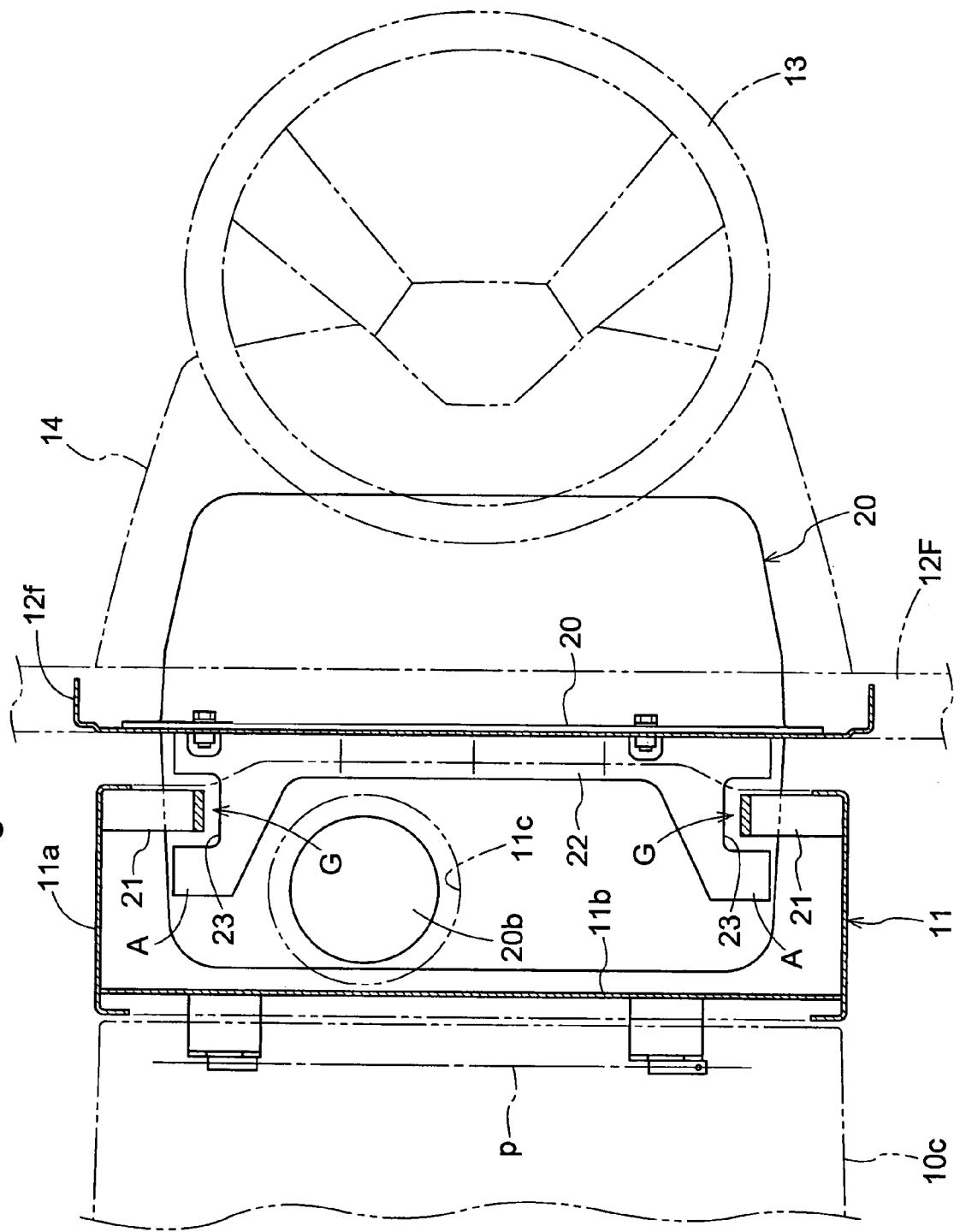
FIG. 4 is a cross-sectional plan view of the main portion.
Figure 5:
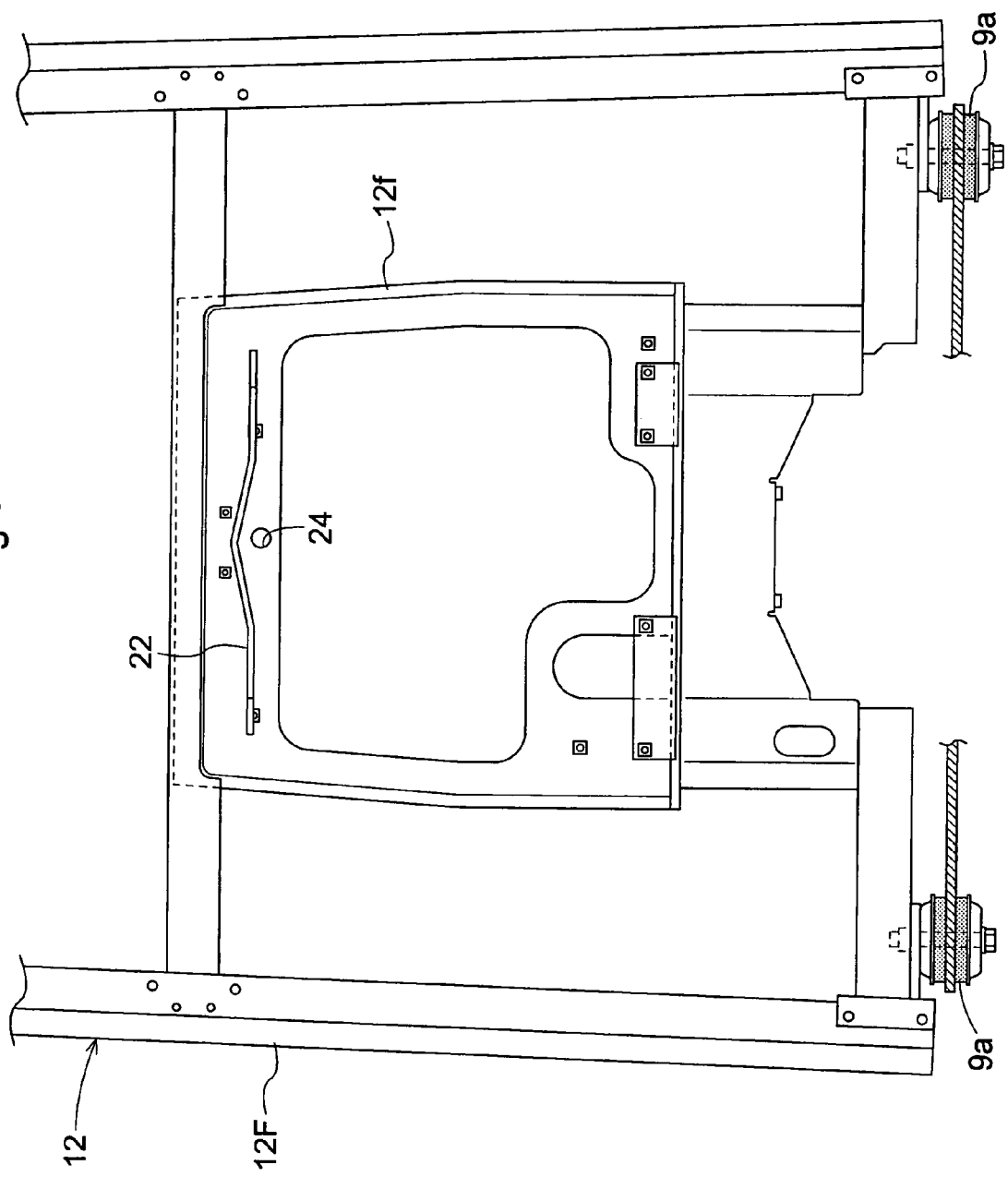
FIG. 5 is a front view showing part of a cabin frame.
Figure 6:
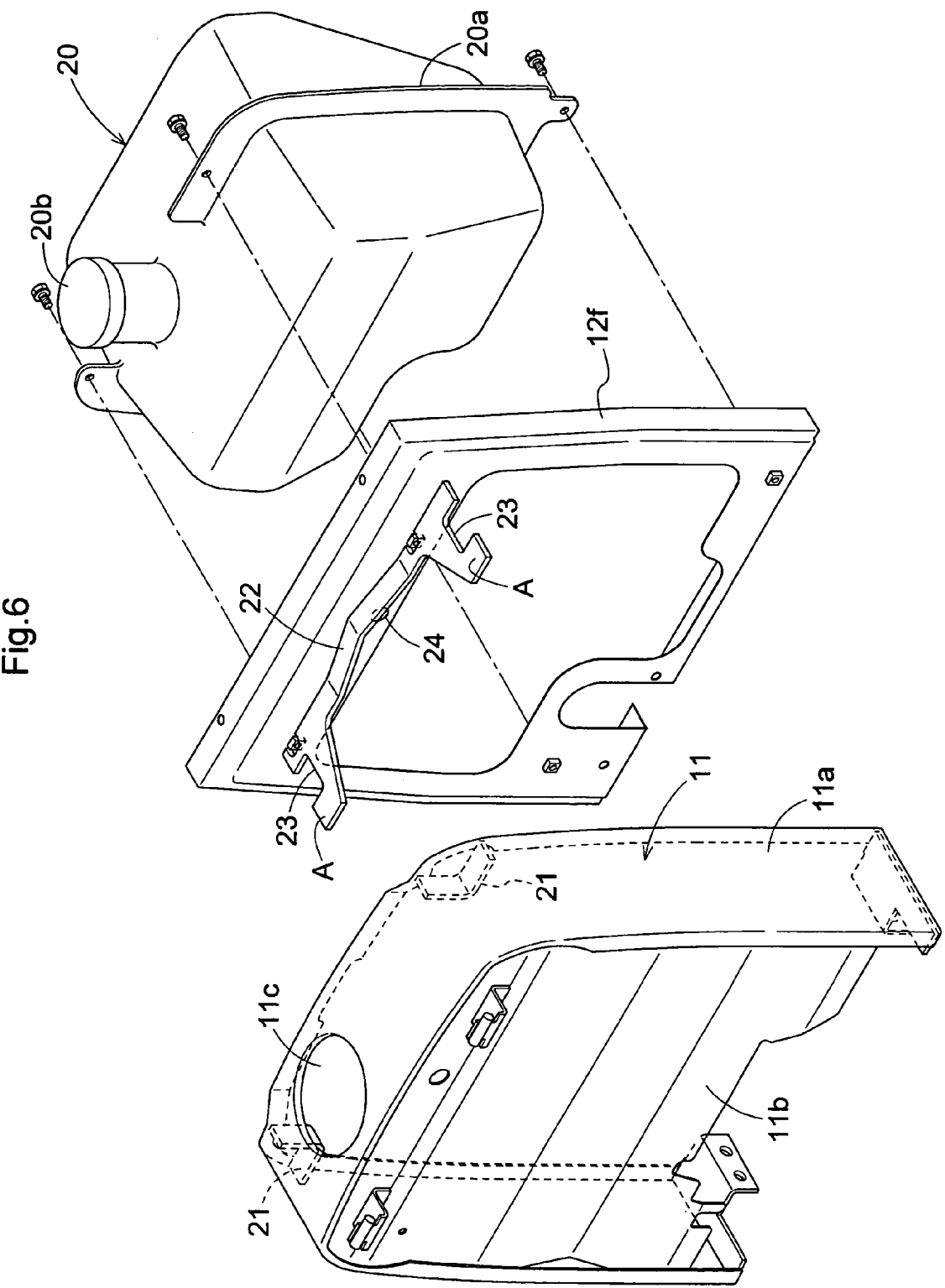
FIG. 6 is an exploded perspective view of a main portion thereof.

Operator's cabin 9 has a cabin frame 12 assembled into a box shape, and attached to the cabin frame 12 are a floor plate, a roof plate, a windshield, a low window, a rear window, and left/right side doors. As shown in FIG. 5, a front frame part 12f having an opening is provided in the center of the lower half of a forepart frame 12F that forms part of the front surface of the cabin frame 12. As shown in FIG. 4, a front cover case 14 that supports a steering wheel 13 and an instrument panel etc. is attached to the front frame part 12f and bulges into the cabin. As shown in FIG. 6, a resin-molded fuel tank 20 is inserted through the front frame part 12f and bolted to the front frame part 12f via a flange 20a that juts out around the periphery of the fuel tank.

The back half of fuel tank 20 is housed within the backward-bulging front cover case 14, while the front half of the tank is housed within the center frame 11 which opens rearwardly. A refueling opening portion 20b with a cap extends from a front portion of the upper surface of the fuel tank 20 and projects upwardly from a circular opening 11 formed in the center of the upper surface of the center frame 11, allowing refueling to be performed without opening the upper hood 10c.

Figure 3:
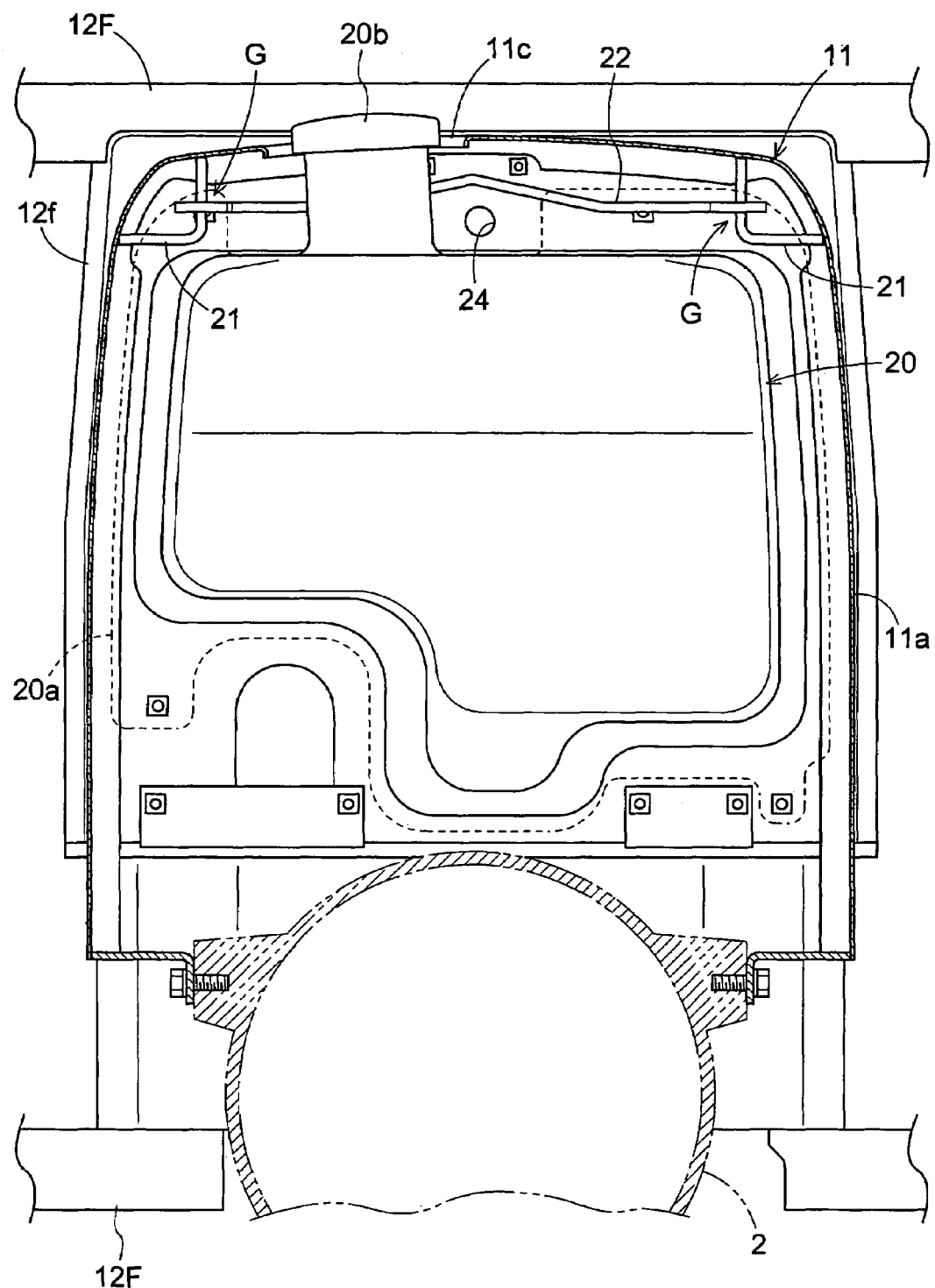
FIG. 3 is front view of the main portion.

As shown in FIG. 3, engaging parts 21 made from L-shaped bent members are provided inside the upper left and right corners of the center frame 11, thereby increasing the stiffness of the center frame 11 against lateral deformation. An elongate engaging member 22 running below the windshield is provided on an upper front portion of the front frame part 12f in cabin frame 12. The engaging member 22 extends generally horizontally and protrudes forward of the front frame part 12f. The engaging member 22 has a midsection of a constant depth front to back, a central portion, and receiving members 23 (see FIG. 4) having recesses formed at either end. Receiving members 23 are engageable with engage engaging parts 21 provided in the upper left and right of the center frame 11. Receiving members 23 each include an arm portion that prevents respective engaging parts 21 from disengaging.

The portions or parts where engaging parts 21 engage receiving members 23 function as external-force transmission parts G for transmitting external forces, acting on operator's cabin 9 in the lateral or the front/back direction, to the center frame 11 when the cabin 9 is displaced laterally or forward/backward by a predetermined amount or greater, while allowing the cabin 9 a certain amount of elastic displacement. That is, external-force transmission parts G regulate the movement of the cabin 9 relative to the center frame 11 when an external force of a predetermined value or greater is applied to the cabin 9 in the lateral or the front/back direction. This predetermined value depends at least on the elastic modulus of the vibration-isolation coupler. The external force includes inertia generated, for example, by the sway of the cabin and the force of collisions with obstacles. The space between a receiving member 23 and a engaging part 21 is formed so that engaging part 21 have less degrees of freedom laterally (left/right) than vertically (up/down).

Also, as most clearly shown in FIG. 5, the laterally central portion of engaging member 22 is bent upward so as to bypass a wiring through-hole 24 formed in the front frame part 12f.

When the present invention has the above structure and operator's cabin 9 is elastically displaced in a vertical direction, refueling opening 20b of fuel tank 20 which displaces together with cabin 1 is displaced vertically within opening 11c formed in the upper portion of the center frame 11.

When the cabin 9 is elastically displaced to a great degree by an external force in the lateral or fore-and-aft direction (i.e. when the external force exceeds a given value), this external force is transmitted to the center frame 11 via the external force transmission parts G. This results in the center frame 11 being displaced together with the cabin 9, and in any lateral or forward/backward displacement of the cabin 9 being suppressed due to the stiffness of the center frame 11. The resulting lack of relative and large lateral or forward/backward displacement between the center frame 11 and fuel tank 20 attached to the cabin 9 means that the refueling opening or mouth 20b does come in contact with the lip of opening 11c formed in the center frame 11 as a result of fuel tank 20 moving laterally or forward/backward relative to the center frame 11.

The engaging member 22 protruding forward of the front surface of cabin frame 12 also functions to catch rain or wash water that seeps through gaps between the front surface of the cabin 9 and the back end of the center frame 11, guiding caught rain/wash water to the sides along the upwardly bent upper surface of the engaging member 22, and draining the water externally from the left and right ends of the engaging member 22, without allowing any water to flow directly into the body.

Further Embodiments (1) External-force transmission parts G in the above structure enable external forces in the lateral or fore-and-aft direction acting on operator's cabin 9 to be transmitted to the center frame 11. However, the present invention can also be implemented using a structure in which, for example, an engaging member provided on the front surface of the cabin frame protrudes between left and right engaging parts 21 provided in the upper left and right corners of the center frame 11 and engages engaging parts 21 from behind to form the external-force transmission parts G, so as to transmit to the center frame 11 only lateral external forces acting on the cabin 9 elastically displaced in a lateral direction by a predetermined amount or greater.

(2) The present invention may also be implemented using a structure in which the center frame 11 is integral with the lower hood 10a of the hood 10.

(3) It is considered to be within the scope of the present invention to provide the engaging parts in the engaging member 22 and to provide the receiving members, each forming a space to accommodate the corresponding engaging part, in the center frame 11.

(4) It is considered to be within the scope of the present invention to have at least one of the engaging parts 21 and the receiving members 23 formed such that they can be elastically displaced to absorb a force in the lateral or for-and-aft direction. This can be done by manufacturing such members from elastic material such as rubber or by incorporating an elastic part such as a spring in such a member.

(5) It is considered to be within the scope of the present invention to eliminate the space between the engaging parts 21 and the receiving members 23.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A tractor comprising:
   a body supported by front wheels and rear wheels;
   an operator's cabin mounted on a rear portion of the body via a vibration-isolation coupler;
   a fuel tank supported by a front surface of the cabin;
   a center frame fixed to the body and enclosing at least both side surfaces and an upper surface of the fuel tank; and
   an external-force transmission part provided between the cabin and the center frame, and capable of transmitting a lateral external force acting on the cabin to the center frame without transmitting a vertical external force.

2. The tractor defined in claim 1, wherein the external-force transmission part includes an engaging part provided on the center frame, and a receiving member provided on the cabin and defining a space for receiving the engaging part, the space in the receiving member being shaped so that the engaging part has less degrees of freedom laterally than vertically.

3. The tractor defined in claim 2, wherein the receiving member is supported on the cabin via an engaging member that extends generally horizontally and protrudes forwardly of a frame of the cabin.

4. The tractor defined in claim 3, wherein a laterally central portion of the engaging member protrudes upward and slopes laterally.

5. The tractor defined in claim 2, wherein a stopper is provided between the receiving member and the engaging part so as to prevent disengagement.

6. The tractor defined in claim 5, wherein the stopper is an arm portion of the receiving member.

7. The tractor defined in claim 1, wherein an opening for a refueling opening of the fuel tank is formed in an upper portion of the center frame.

8. A tractor comprising:
   a body supported by front wheels and rear wheels;
   an operator's cabin mounted on a rear portion of the body via a vibration-isolation coupler;
   a fuel tank supported by a front surface of the cabin;

a center frame fixed to the body and enclosing at least both side surfaces and an upper surface of the fuel tank; and an external-force transmission part provided between the cabin and the center frame, the external-force transmission part being configured to allow vertical movements of the cabin with respect to the center frame and capable of transmitting a lateral external force acting on the cabin to the center frame when the lateral external force exceeds a predetermined value.

9. The tractor defined in claim 8, wherein the predetermined value depends on at least an elastic modulus of the vibration-isolation coupler.

10. The tractor defined in claim 8, wherein the external-force transmission part includes an engaging part provided on the center frame, and a receiving member provided on the cabin and defining a space for receiving the engaging part, the space in the receiving member being shaped so that the engaging part has less degrees of freedom laterally than vertically.

11. The tractor defined in claim 8, wherein the external-force transmission part includes an engaging part provided to one of the center frame and the cabin, and a receiving member provided to the other of the center frame and the cabin and defining a space for receiving the engaging part, the space in the receiving member being shaped so that the engaging part has less degrees of freedom laterally than vertically.

* * * * *